July 21, 1953        V. C. BELT        2,646,157

DOLLY FRAME FOR MATERIAL-CONVEYING ELEVATORS

Filed Feb. 26, 1951        2 Sheets-Sheet 1

INVENTOR
Vernon C. Belt

BY

ATTORNEY

July 21, 1953 V. C. BELT 2,646,157
DOLLY FRAME FOR MATERIAL-CONVEYING ELEVATORS
Filed Feb. 26, 1951 2 Sheets-Sheet 2
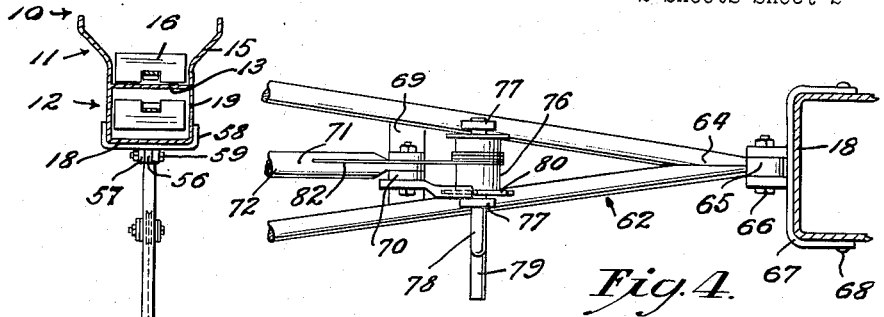
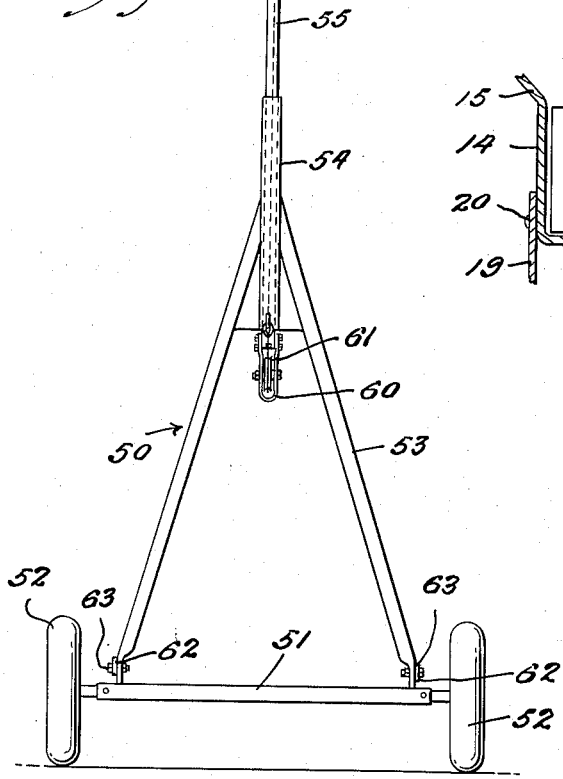
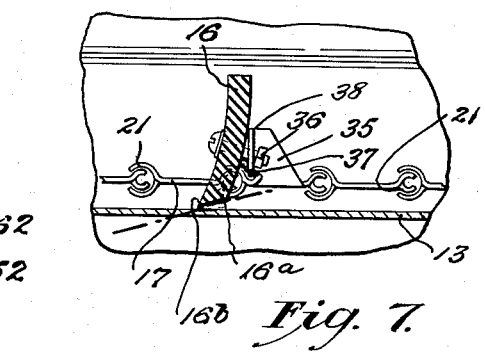
INVENTOR
Vernon C. Belt
BY
ATTORNEY Patented July 21, 1953

2,646,157

UNITED STATES PATENT OFFICE 2,646,157

DOLLY FRAME FOR MATERIAL-CONVEYING ELEVATORS

Vernon C. Belt, Orient, Ohio, assignor to The Belt Corporation, Orient, Ohio, a corporation of Ohio Application February 26, 1951, Serial No. 212,804

6 Claims. (Cl. 198—121)

1

The present invention relates to portable elevator conveyors of the type employed in transferring loose bulk agricultural or industrial products or materials from a relatively low loading or gathering level to an elevated discharge level.

In the past, elevator conveyors of this character have been widely used in connection with the transporting of agricultural products, such as small grains and ear corn from ground or vehicle levels to relatively elevated storage lofts or bins.

In general, such elevator conveyors comprise a trough-like frame in which is mounted a power driven continuous or endless conveyor which functions to advance bulk commodities introduced at one end of the frame upwardly on an inclined plane and to discharge such commodities from the upper end of the frame. However, such previously known elevator conveyors possess certain objectionable features, particularly with reference to the difficulty in properly supporting the conveyor at a desired angle between loading and discharge zones, and where it is desired that the loading end of the conveyor be positioned in close proximity to the ground level to facilitate loading operations.

Another objectionable feature of the usual elevator conveyor comprises the inability of the conveyor to efficiently advance relatively loose and finely divided bulk materials from the loading to the discharge ends thereof, by reason of the inefficient construction of the material-advancing flights carried upon the endless conveyor chain or belt. Oftentimes, it is desired to elevate loose relatively finely divided materials in conveyors of this type, and it is therefore prerequisite that the tolerances or spacings between the individual advancing flights and the inner side walls of the associated trough frame be kept at a minimum to prevent relative finely divided grains or granules of material from overrunning the upper surface of the flights, or from sifting between the edges of the flights disposed adjacent to the inner walls of the conveyor trough.

It follows, therefore, that the primary object of the present invention is to provide an improved and mechanically efficient portable or mobile elevator conveyor for bulk materials which may be easily adjusted so as to vary its angle of inclination or elevation whereby to adapt the same for use between loading and discharging zones of varying heights, and which is characterized by its mechanical efficiency in conveying relatively finely divided bulk materials in a manner to prevent the overriding of the flights of the conveyor by such materials or the sifting thereof between

2 the edges of the conveyor flights and the associated trough-like frame.

It is a further object of the present invention to provide an improved dolly-type frame for supporting elevating conveyors of this character and for adjusting the angle of inclination of such conveyors in accordance with the varying elevations between loading and discharging stations.

It is a further object of the present invention to provide in an elevator conveyor an improved semiflexible conveyor flight which is formed to present a forward relatively shallow concave material-engaging face which functions during advancing movement of the conveyor to scoop relatively finely divided materials, such as corn grains or the like, upwardly and forwardly from the floor or bottom surface of the associated conveyor trough to prevent overriding of such materials by the flights, and thereby to increase the effective conveying capacity of the elevator conveyor.

For a further and more detailed understanding of the invention and various additional objects and advantages realized thereby, reference is to be had to the following description and the accompanying drawings, wherein:

Fig. 3 is a vertical sectional view taken along the line 3—3 of Fig. 2 and showing the adjustable dolly in end elevation;

Fig. 4 is a detailed fragmentary sectional view taken along the line 4—4 of Fig. 2;

Fig. 5 is a detailed fragmentary vertical sectional view of the adjustable pulley carried at the lower end of the telescoping pedestal of the dolly;

Fig. 6 is an enlarged transverse vertical sectional view taken through the upper run of the present elevator conveyor; and Fig. 7 is a vertical sectional view taken along the line 7—7 of Fig. 6.

Figures 1, 2:
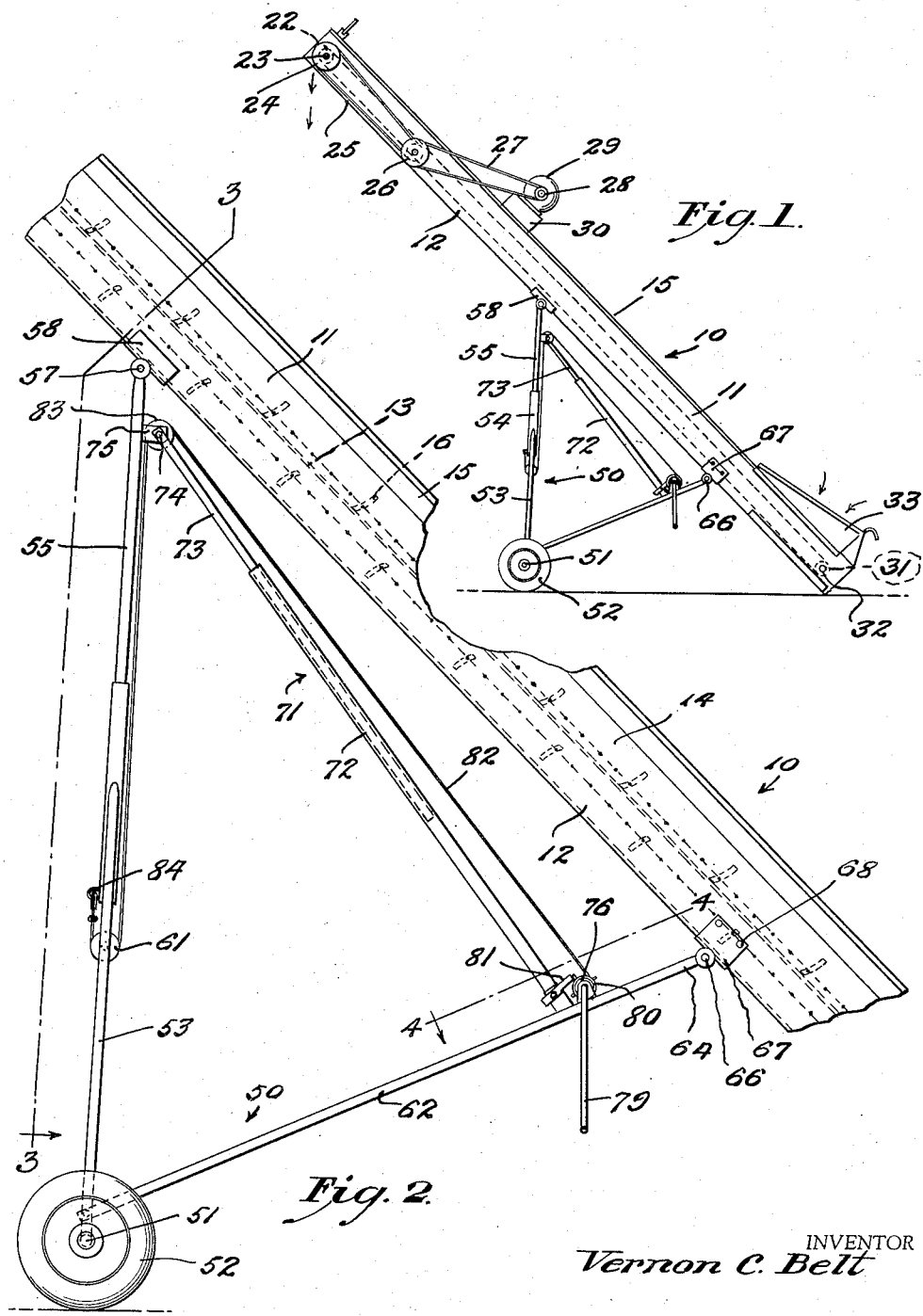
Fig. 1 is a side elevational view of the present portable elevator conveyor.
Fig. 2 is an enlarged side elevational view of the adjustable dolly for the elevator conveyor.

Referring to the drawings, the numeral 10 designates generally an elongated trough-like frame comprising upper and lower longitudinally coextensive flight-containing sections 11 and 12, respectively. The upper flight-containing section 11, as shown particularly in Fig. 6 of the drawings, is preferably of single piece formation and comprises an elongated sheet metal body formed to provide a substantially flat bottom wall 13 and contiguous perpendicularly related side walls 14 which terminate toward their outer ends in outwardly flared continuations 15. The upper flight-receiving section 11 provides in its lower region a substantially rectangular open-topped compartment whose width dimension corresponds closely to the longitudinal dimensions of a plurality of conveyor flights 16 carried upon an endless flexible conveyor chain 17. The outwardly flared side wall extensions 15 form a relatively widened open top for the trough-like frame 10.

The lower flight-receiving section 12 preferably comprises a second sheet metal body of generally U-shaped cross section and formed to provide a bottom wall 18 and spaced parallel side walls 19. Advantageously, the upper extremities of the side walls 19 of the lower flight-receiving section are bolted or riveted, as at 20, to the lower portion of the side walls 14 of the upper flight-receiving section. Thus, a lower flight-receiving compartment is provided between the bottom walls 13 and 18 of the respective sections.

The conveyor chain 17 comprises the usual open link flexible type formed with interfitting end formations 21, and is trained at its upper end around a driving gear 22 carried intermediately of an axle shaft 23 which is journaled transversely in the upper end portion of the frame 10. One end of the axle shaft 23 extends outwardly through one side of the frame 10 and carries a drive pulley 24 which is driven in rotation by means of an endless belt 25 having its opposite end trained about an intermediate drive pulley 26 rotatably supported on the outer side of the frame 10 a distance inwardly thereof from the outer end. The intermediate drive pulley 26 is in turn rotated by a second endless drive belt 27 which is drivingly connected with the drive shaft 28 of a relatively small lightweight internal combustion engine 29.

Advantageously, the engine 29 may be mounted upon a pedestal-supporting frame 30, which extends transversely of the conveyor frame 10 and which may be securely bolted or otherwise fastened to the upper edges of the upper flight-receiving section of the frame. The opposite or lower end of the conveyor chain 17 is trained about an idler gear 31, which is carried upon a transversely extending shaft 32 extending between the side walls of the frame 10 at the lower or discharge end thereof.

It will be understood that the intermediate wall 13 which separates the upper and lower flight-receiving compartments, is terminated short of the upper and lower ends of the frame to permit the flights 16 to move between the upper and lower compartments and around the gears 22 and 31. The lower end portion of the frame 10 is provided on either side with outwardly flared hopper-forming walls 33 which form an enlarged loading chamber at the lower end of the conveyor.

Referring now in detail to Figs. 6 and 7 of the drawings, it will be seen that the conveyor flights 16 are preferably formed from a semi-flexible material, such as vulcanized rubber or the like, molded to provide a generally arcuate concavo-convex cross-sectional configuration. The length of the individual flight 16 corresponds closely to the width of the upper flight-receiving compartment in order that the side edges of the flights move in substantial wiping engagement with the inner side walls of the frame 10. The lower central region of each flight 16 is recessed as at 34 to provide a passage for the conveyor chain 17. At spaced longitudinal intervals, the conveyor chain 17 is provided with perpendicularly extending attachment brackets 35 to which the individual flights 16 are bolted as at 36. Due to the transverse contour of the flights 16, a spacer rod 37 is interposed between the rear surface of the flight and the transverse flanges 38 of the attachment brackets to position the flight as shown in Fig. 7 with the lower edge thereof extending in advance of the remaining body portion. The disposition of the flights 16 enables the lower edge thereof to closely hug the bottom wall 13 and thereby tend to scoop relatively finely divided materials upwardly and forwardly from the bottom wall. At the same time, the transverse contour of the flights enables the upper portion thereof to occupy a substantially perpendicular position with respect to the transverse wall 13 of the conveyor frame thereby preventing overriding of the flights by relatively loose finely divided materials during advancing movement of the conveyor.

Referring to Figs. 1 through 5, the conveyor frame 10 is supported upon a dolly frame generally indicated by the numeral 50. The dolly comprises a substantially horizontally disposed axle member 51 which rotatably carries at its opposite ends a pair of ground wheels 52. Arising from the axle member 51 is a forward inverted V-shaped frame 53 which carries at its upper or apex end a tubular bearing sleeve 54. Extending through and slidably carried within the sleeve 54 is a shaft 55 or boom which is formed at its upper end with a flattened pin-receiving boss 56. The boss 56 is formed with a central pin-receiving opening and is pivotally connected between a pair of depending ears 57 formed on the lower end of a cradle bracket 58, the boss 56 and ears 57 being pivotally united by a nut and bolt combination 59. The cradle bracket 58 slidably receives the bottom wall 18 of the lower flight-receiving section 12 of the conveyor. At its lower end, the shaft 55 or boom is provided with a U-shaped pulley-supporting bracket 60 in which is rotatably mounted a pulley wheel 61.

Extending rearwardly of the dolly is a second V-shaped frame 62 which is rigidly connected as by means of bolts 63 with the lower ends of the frame 53. The side members of the frame 62 are joined together, as at 64, adjacent the bottom wall of the conveyor frame 10 and terminate in a single pivot boss 65 which is pivotally connected as by the bolt 66 with a second cradle bracket 67. The lowermost cradle bracket 67 is rigidly secured to the conveyor frame as by bolts or rivets 68. The frame 62 a distance inwardly from its apex, is provided with a bracket 69 having outwardly projecting bifurcated ears 70. Pivotally connected between the ears 70 is one end of a longitudinally extensible hypotenusal arm 71 which advantageously may be formed from two telescoping tube sections 72 and 73. The opposite end of the arm 71 terminates in a bifurcated end portion 74 which is pivotally connected on either side of a pulley-supporting bracket 75 rigidly carried upon the upper end portion of the shaft or boom 55.

Mounted adjacent to the juncture of the frame 62 and arm 71 is a drum-type windlass 76 which is rotatably supported between brackets 77 extending outwardly from the side members of the frame 62. The windlass drum 76 is carried upon a shaft 78 which terminates at one end in a crank extension 79. At one end, the drum 76 is provided with a ratchet gear 80, the teeth of which are engaged in one direction of rotation by a pawl 81 pivotally carried upon the bracket ear 70. Wrapped about the drum 76 is one end portion of a flexible cable or line 82 which extends in substantial parallelism with the extensible arm 71, and which is received in its intermediate region by a pulley 83 rotatably carried by the bracket 75. The line 82 extends from the pulley 83 around the pulley 61 carried at the lower end of the shaft or boom 55, and the free end of the line 82 is secured by means of interconnected eyelets 84 to the tubular sleeve member 54 stationarily carried by the forward frame 53.

In operation, the dolly frame 50 may be adjusted to vary the angle of inclination of the elevator conveyor in a manner to elevate or depress the upper or discharge end of the conveyor. The weight of the conveyor normally tends to slide the shaft or boom 55 downwardly within the tubular sleeve 54 due to the location of the forward cradle bracket 58 at or near the center of gravity of the conveyor. Figs. 1 and 2 of the drawings show the conveyor in its position of substantially maximum elevation. Upon release of the ratchet pawl 81, the weight of the conveyor acts downwardly upon the boom 55 tending to slide the same downwardly within the sleeve 54. This force is effective to cause simultaneous lowering of the boom 55 and upward sliding movement of the cradle bracket 58 with respect to the bottom of the conveyor. At the same time, the hypotenusal arm 71 is extended to permit the conveyor to pivot in a counterclockwise direction about an axis defined by the bolt 66 pivotally connecting the frame 62 with the conveyor frame.

The line 82 is simultaneously paid out or unwound from the drum 76 to permit extension of the arm 71 and sliding movement of the boom 55 downwardly with respect to the sleeve 54. To elevate the conveyor and increase the angle of inclination thereof, the hand crank 79 is rotated in a clockwise direction as viewed from Fig. 2 to draw in on the line or cable 82. Winding inwardly on the cable 82 first draws the tubular extension 73 inwardly of the section 72 to decrease the length of the arm 71. At the same time, the cradle bracket 58 slides downwardly along the bottom of the conveyor to slightly elevate the latter, and after retraction of the arm 71, continued rotation of the drum 76 elevates the shaft or boom 55 to further increase the angle of inclination of the conveyor 10.

In view of the foregoing, it will be seen that the present invention provides an improved and mechanically efficient elevator conveyor particularly adapted for farm and agricultural use in transferring grain, or relatively large bulk materials between loading and discharge stations located at different elevations. Elevator conveyors formed in accordance with the present invention are characterized by their versatility of operation in connection with both large and relatively small bulk materials, and also with respect to the adjustability derived through the kinematic linkage employed in the supporting dolly.

It will be noted that the conveyor flights 16 support the chain 17, spacing the latter from the conveyor frame plate 13. The weigtht of the chain thus serves to maintain the lower edges of the flights in proper operating relationship to the plane defined by the upper surface of the frame plate 13. By reference to Fig. 7, it will be observed that the lower surface 16a of each flight 16 is disposed in acute angular relationship to the plane of the upper surface of the plate 13. Thus the lower leading edge 16b of each flight is so disposed that the pressure of the materials engaged by the flight is utilized to hold the flight down on the upper surface of the plate 13, preventing the flights from lifting upwardly and over-riding the materials being conveyed.

In the construction of the dolly truck or frame, the extensibility of the boom 55 and the rod 73 causes the dolly frame in all its positions of adjustment in response to the angularity of the elevator to maintain the latter stable against undue tilting action. In dolly frames heretofore employed, when the elevator frame is raised to assume a steep angular position, there is a tendency for the dolly frame to assume such positions in relation to the center of gravity of the elevator frame as to cause the latter to tilt readily and become unbalanced. The extension feature of my improved dolly frame avoids or minimizes this situation, maintaining its associated elevator secure in all its various operating positions.

Various changes may be made in the construction of my improved apparatus without departing from the spirit and scope of the following claims.

I claim:

1. A dolly for supporting material-handling elevators wherein the latter are of the type embodying longitudinally extending frames containing power driven conveyors, said dolly comprising: a frame embodying base members, means pivotally uniting the forward ends of said base members with the forward and lower part of an associated elevator frame, a transversely extending wheeled axle, means uniting the rear ends of said base members with said axle, a rearwardly disposed altitudinal frame having upwardly converging side members and a centrally disposed socket member, means pivotally uniting the lower ends of said side members with said axle, a boom member slidably received in said sleeve member, a guide formed on the lower end of said boom member, a saddle member pivotally carried on the upper end of said boom member, said saddle member being movable longitudinally of and arranged in supporting engagement with the under side of the associated elevator frame, longitudinally extensible and collapsible hypotenusal frame members pivotally connected to the forward end of said base members and at the rear end thereof to said boom member, spooling means on said dolly frame, and a cable anchored at one end on said altitudinal frame and joined at its other end with the spooling means, intermediate portions of said cable passing around the guide on the lower end of said boom member.

2. A dolly frame for material-handling elevators, comprising an axle carrying ground-engaging wheels at the ends thereof, a base frame pivotally connected at the forward end thereof with the forward under side of the frame of an associated elevator, means pivotally uniting the rear end of said frame with said axle, an altitudinal frame pivotally joined at its lower end with said axle, said altitudinal frame being formed with a socket in the center and upper end thereof, a boom member slidably mounted in said socket, said boom member projecting through and below said socket, a cable guide carried by the lower projecting end of said boom member, a saddle pivotally carried by the upper end of said boom member, and slidably engaged with the rearward under side of the associated elevator frame and movable lengthwise thereof, telescopic hypotenusal members pivotally joined at their rear ends with said boom member and at their forward ends with said base frame, and manually operated cable means passing over said guide for moving said boom member longitudinally of the socket of said altitudinal frame and holding said boom member in its positions of adjustment with respect to said socket.

3. A dolly for effecting the portable support of elevator frames and retaining said frames in various angular positions of operation with respect to the vertical, said dolly comprising a frame composed of base, relatively angularly disposed altitudinal and hypotenusal members constituting an adjustable frame, the altitudinal and hypotenusal members being each composed of telescoping parts including respectively upwardly and rearwardly disposed end members, the effective length of which being extensible and contractible, means pivotally uniting the upper and rearwardly extending end members of the altitudinal and hypotenusal frame members in articulated relationship, a wheeled axle, means pivotally uniting the lower and rearward ends of the base members with said axle and the lower ends of the altitudinal frame with said axle, means pivotally uniting the forward ends of the base members with the frame of an associated elevator, cable and drum means controlling the expansion and contraction of the frame members constituting the altitudinal and hypotenusal frames, and means for locking said cable and drum mechanism in controlled positions of frame adjustment.

4. An adjustable dolly frame for material-handling elevators, comprising a wheeled axle, base-forming frame members pivotally united at the rear ends thereof with said axle for turning movement about a substantially horizontal axis, means pivotally uniting the forward ends of said base-forming frame members with the frame of an associated elevator, said dolly frame further including rearwardly disposed altitudinal frame members, said latter frame members having their lower ends pivotally connected with said axle for turning movement about said horizontal axis, said altitudinal frame members being formed centrally and upwardly thereof with an elongated bearing opening constituting a socket, a boom member longitudinally movable in said socket, the upper and lower ends of said boom member projecting above and below said socket, a saddle carried by the upper end of said boom member, said saddle having longitudinally movable supporting engagement with the frame of the associated elevator, a cable guide carried by the lower end of said boom member, telescopic hynotenusal tubes constituting a part of the dolly frame, means pivotally uniting the forward and lower ends of said tubes to the forward end of the base-forming frame members, means pivotally connecting the rear ends of the hypotenusal tubes to said boom member, a cable, anchoring means for securing one end of said cable to said altitudinal frame members with intermediate portions of the cable passing over said guide, manually operated spooling means rotatably carried by the base-forming frame members contiguous to the forward ends of the latter, a second guide for said cable formed at the pivotal juncture of the boom member and hypotenusal tubes and about which said cable is trained and forwardly directed to said spooling means, and means for retaining said spooling means against accidental rotation.

5. An under carriage for portable loading elevators of the type embodying a rigid, longitudinally extending conveyor trough, said under carriage comprising: an adjustable substantially triangular frame composed essentially of base, altitudinal and hypotenusal frame members, the altitudinal and hypotenusal members including upper and lower telescopic sections; axle means to which are connected contiguous ends of the base and altitudinal members, said axle means being provided with ground-engaging wheels; means pivotally joining the forward end of said base member with a stationary part of said elevator trough; supporting means for said trough slidable longitudinally thereof and to which is joined the upper section of said altitudinal member; means pivotally connecting the lower section of said hypotenusal member with the forward end of said base member; means pivotally connecting the upper section of said hypotenusal member with the upper section of the altitudinal member; and adjustable cable and drum means carried by said frame members for raising and lowering the telescopic sections of said altitudinal member of the under carriage frame, whereby to cause said conveyor trough to assume and maintain various inclined positions of operation with respect to the horizontal.

6. An under carriage structure for portable loading machines having longitudinally extending conveyor troughs, comprising a wheeled frame, the latter embodying rigid base, altitudinal and hypotenusal members, said hypotenusal and altitudinal members including upper and lower telescopically related sections by which the effective lengths thereof may be varied; wheel-carrying axle means joined with adjacent ends of said base and altitudinal members; means pivotally uniting a forward end of said base member with the trough of an associated loading machine; pivotal means slidably connecting the upper section of said altitudinal member with said trough; a guide on the lower end of the upper section of said altitudinal member; a cable fastened at one end to the upper part of the lower section of said altitudinal member, said cable having the intermediate portion thereof trained about said guide; and a drum with which said cable is joined, said drum being rotatably mounted on said base section and being operative to vary the effective length of said cable in the raising and lowering of the upper section of the longitudinal member in governing the inclination of the associated conveyor trough.

VERNON C. BELT.

References Cited in the file of this patent

UNITED STATES PATENTS

| Number | Name | Date |
| --- | --- | --- |
| 614,066 | Sharp | Nov. 8, 1898 |
| 2,387,189 | Steinmetz | Oct. 16, 1945 |
| 2,438,083 | Whitney | Mar. 16, 1948 |
| 2,573,908 | Hyman | Nov. 6, 1951 |

FOREIGN PATENTS

| Number | Country | Date |
| --- | --- | --- |
| 571,201 | Germany | Feb. 24, 1933 |